(12) United States Patent
Park

(10) Patent No.: US 8,383,022 B2
(45) Date of Patent: Feb. 26, 2013

(54) METHOD FOR MANUFACTURING A LIGHT GUIDE PLATE

(75) Inventor: Jae-Hyun Park, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 555 days.

(21) Appl. No.: 12/561,806

(22) Filed: Sep. 17, 2009

(65) Prior Publication Data

US 2010/0157626 A1      Jun. 24, 2010

(30) Foreign Application Priority Data

Dec. 23, 2008   (KR) .................. 10-2008-0132143

(51) Int. Cl.
*B29D 11/00* (2006.01)
(52) U.S. Cl. .................. 264/1.38; 264/1.6; 264/2.7
(58) Field of Classification Search .................. 264/1.38, 264/1.6, 1.7, 2.7, 1.1, 1.32, 1.36, 132; 425/808, 425/810
See application file for complete search history.

(56) References Cited

FOREIGN PATENT DOCUMENTS

| CN | 101278229 A | 10/2008 |
|---|---|---|
| JP | 61-154927 | * 7/1986 |
| KR | 2007-101951 | * 10/2007 |

* cited by examiner

*Primary Examiner* — Mathieu D. Vargot

(74) *Attorney, Agent, or Firm* — Birch, Stewart, Kolasch & Birch, LLP

(57) ABSTRACT

Disclosed are a film-type light guide plate capable of readily securing mass-production and realizing low weight and slimness, a method for manufacturing the same and a backlight unit using the same. The method includes loading a base film on a movable first conveyor belt, coating a liquid ultraviolet curable resin on the first surface of the base film, rotating a surface-treated roll on the coated ultraviolet curable resin to form a prism pattern provided with a first protrusion pattern, and curing the prism pattern using an ultraviolet lamp.

5 Claims, 9 Drawing Sheets

METHOD FOR MANUFACTURING A LIGHT GUIDE PLATE

This application claims the benefit of Korean Patent Application No. 10-2008-0132143, filed on Dec. 23, 2008, which is hereby incorporated by reference as if fully set forth herein.

BACKGROUND OF THE INVENTION

1. Field of the Invention

The present invention relates to a backlight unit. More specifically, the present invention relates to a film-type light guide plate capable of readily securing mass-production and realizing low weight and slimness, a method for manufacturing the same and a backlight unit using the same.

2. Discussion of the Related Art

Cathode ray tubes (CRTs) are general purpose display devices that are used for TVs, measurement instruments, and monitors such as information terminals. However, CRTs cannot actually meet demands for miniaturization and low weight due to their weight and size.

Accordingly, counter to the recent trends toward miniaturization and low weight of electronic products, CRTs have limitations such as weight and size. Thus, liquid crystal displays (LCDs) using electro-optical effects, plasma display panels (PDPs) using gas discharge and electroluminescence displays (ELDs) using electroluminescent effects are potential alternatives to CRTs. Of these, liquid crystal displays (LCDs) are being actively studied.

Liquid crystal displays (LCDs) having advantages including miniaturization, low weight and low power consumption have been actively developed as alternatives for CRTs. LCDs capable of sufficiently serving as flat panel displays are developed and used for laptop computer monitors, desktop computer monitors, large information display devices, etc. Accordingly, demand for liquid crystal displays (LCDs) is gradually increasing.

Most LCDs are light-receiving devices which display an image by controlling an amount of light entering from the outside. A separate light source (i.e., a backlight unit) to irradiate light to an LCD panel is necessarily required.

Generally, a backlight unit used as a light source of liquid crystal displays (LCDs) is a silver cylindrical fluorescent lamp and is classified into an edge-type and a direct-type.

First, direct-type backlight units were the first to be developed, since liquid crystal displays (LCDs) increased in size above 20 inches. Such a direct-type backlight unit directly emits light to the front side of a LCD panel through a plurality of lamps arranged in a row.

An edge-type backlight unit comprises a lamp unit on the side of a light guide plate to guide light, wherein the lamp unit comprises a lamp to emit light; a lamp holder inserted into both ends of the lamp, to protect the lamp; and a lamp reflection plate which surrounds the circumference of the lamp, and has one side inserted into the one side of a light guide plate and thus reflects from a lamp to the light guide plate.

An edge-type backlight unit wherein a lamp unit is arranged on the side of the light guide plate is applied to small liquid crystal displays (LCDs) such as laptop computers or desktop computers and has advantages of uniform distribution of light, long lifecycle and the slimness of liquid crystal displays (LCDs).

Hereinafter, a conventional light guide plate will be illustrated with reference to the annexed drawings.

The light guide plate is classified into two types, i.e., a wedge type and a flat type. For example, FIG. 1A illustrates a wedge-type light guide plate including a light-receiving portion and a non-light-receiving portion having different thicknesses and FIG. 1B illustrates a flat-type light guide plate having a light-receiving portion having the same thickness.

FIG. 2 is a schematic view illustrating a light-emission principle of a general light guide plate.

As shown in FIG. 2, a light guide plate 10 is arranged on the side of a lamp 5, and a protrusion pattern 10a is arranged under the light guide plate 10. The light guide plate 10 is made of a material having a refractive index higher than that of air. For light-emission of the light guide plate, at the interface between air and the light guide plate 10, when transmitting from a high refractive index material to a low refractive index material, light is not refracted and total reflection occurs on the interface in accordance with Snell's law. When a pattern is absent, the light entering the light guide plate 10 through total-reflection can be transmitted to the edge. Accordingly, in order to transmit guided light to the outside of the light guide plate 10, light is refracted through the protrusion pattern 10a at an angle to prevent total-reflection through the protrusion pattern 10a and transfers above the light guide plate 10. Light is emitted from regions where the protrusion patterns 10a are present in proportion to the size of the protrusion patterns 10a and then transfers to the top of the light guide plate 10. The protrusion patterns 10a may be different in respective regions in order to emit totally uniform light.

The light guide plate 10 is generally formed by injection molding. The formation process will be illustrated with reference to the annexed drawings.

FIG. 3 is a schematic view illustrating an injection molding apparatus used for formation of a light guide plate.

As shown in FIG. 3, an injection molding apparatus used for the formation of the light guide plate comprises a cavity portion 30 to define the shape of the light guide plate, and a molten resin-injection portion 40 connected to the cavity portion 30, which transmits a thermoplastic resin to the cavity portion 30 and controls flow of the resin.

The cavity portion 30 includes a first mold 31 and a second mold 32 that may be separated from each other, and a hole 35 provided between the first and second molds 31 and 32, when the first and second molds 31 and 32 come into contact with each other. The shape of the hole 35 corresponds to the desired shape of the light guide plate.

A gate 44 is provided between the cavity portion 30 and the molten resin injection portion 40 and allows a thermoplastic resin to flow through the molten resin injection portion 40.

The molten resin injection portion 40 includes an injection cylinder 42 to store the thermoplastic resin 41 and a screw 43 to control discharge of the thermoplastic resin 41 from the cylinder 42.

The injection molding using the injection molding apparatus comprises tightening the first and second molds 31 and 32 of the cavity portion 30, injecting a liquid form of the molten resin 41 through the gate 44 into the hole 35 corresponding to the desired shape of the light guide plate provided between the molds, performing injection molding at high pressure and high pressure, and cooling and curing the thermoplastic resin into the hole 35 to form a light guide plate. The method further comprises opening the first and second molds 31 and 32 to separate the light guide plate formed by assembling the molds 31 and 32 therefrom, thereby completing the formation.

FIGS. 4A and 4B are vertical-sectional views illustrating an example of the injection-molded light guide plate.

As shown in FIGS. 4A and 4B, the light guide plate separated from the cavity portion 30 is injection-molded, cured and then left in the form of a protrusion pattern together with the thermoplastic resin left in the region corresponding to the gate 44.

In this case, the protrusion pattern should be removed through an additional post-process such as cutting, or grinding.

FIG. 5 is a schematic view illustrating a conventional cavity portion comprising a mold for formation of a light guide plate.

As shown in FIG. 5, for the conventional injection molding apparatus for formation of light guide plates, the cavity portion shown in FIG. 3 comprises a main core 62 including molds spaced from each other, and a stamper pattern 61 corresponding to a pattern 61a present on the surface of the hole 35 provided between the spaced molds.

The formation of the light guide plate requires manufacturing processes for the main core 62 and the stamper pattern 61.

The mold of the main core 62 determines the type of the light guide plate, i.e., a wedge or flat type. An inclined pattern 63 is provided in the main core 62 and omitted when the light guide plate is a flat type.

The formation of the main core 62 is basically carried out by body formation, surface coating and side grinding (wedge type) in this order.

The shape of the stamper pattern 61 determines a dispersion pattern density on the surface of the light guide plate. The manufacturing of the stamper pattern 62 is carried out by forming a bite for processing the pattern, processing a stamper pattern and forming a stamper pattern coating film.

As such, after manufacture of the main core 62 and the stamper pattern 61, molds spaced from each other are finally assembled to complete the cavity portion 30.

SUMMARY OF THE INVENTION

Conventional light guide plates have disadvantages as follows:

First, a conventional light guide plate is formed by injection molding, thus involving costs and time associated with manufacture of molds and optimal injection conditions required for injection molding. This conventional method discontinuously enables one light guide plate to be injected from one injection apparatus, thus making it impossible to realize mass production.

Second, a great number of mold cores (main cores) for injection-molding molds in order to manufacture a mass of light guide plates are required. In this case, as in the aforementioned mold formation process, mold manufacturing involves considerable time and labor costs, thus causing deterioration in production efficiency. In addition, manufacturing factors of the injection molding apparatus, such as the injection speed, pressure and cooling speed of the molten resin, and the arrangement of eject pins should be considered and a great deal of trial and error is thus inevitable to obtain stable injection conditions of these factors.

Third, the limitations of injection molding materials and injection apparatuses make it difficult to develop lightweight and thin light guide plates. Materials generally used for the injection molding include polymethyl methacrylate (PMMA) and polycarbonate (PC). These materials have an injection molding ratio of about 0.6 to 0.8, thus making it impossible to develop a predetermined thinness level of light guide plate.

Accordingly, the present invention is directed to a to provide a light guide plate, a method for manufacturing the same and a backlight unit using the same that substantially obviate one or more problems due to limitations and disadvantages of the related art.

It is an object of the present invention to provide a film-type light guide plate capable of easily securing realizing mass-production and realizing low weight and thinness, a method for manufacturing the same and a backlight unit using the same.

To achieve these objects and other advantages and in accordance with the purpose of the invention, as embodied and broadly described herein, provided is a method for manufacturing a light guide plate, including: loading a base film on a movable first conveyor belt; coating a liquid ultraviolet curable resin on a first surface of the base film; rotating a surface-treated roll on the coated ultraviolet curable resin to form a prism pattern provided with a first protrusion pattern; and curing the prism pattern using an ultraviolet lamp.

After loading the base film, the coating of the liquid ultraviolet curable resin and forming and curing of the prism pattern may be carried out by continuously moving the base film on the first conveyor belt.

The surface-treatment of the roll may be carried out by applying a material for mirror-treatment to the roll or treating the roll with a prism pattern.

The method further includes: loading the base film on the prism pattern arranged on the movable second conveyor belt, after curing the prism pattern; coating a liquid ultraviolet curable resin on a second surface reversing the first surface of the base film; placing a mold portion provided with a predetermined surface pattern on the ultraviolet curable resin and then transcribing the surface pattern of the mold portion to the ultraviolet curable resin; and curing the transcribed ultraviolet curable resin using an ultraviolet lamp to form a dot pattern.

The method further includes: after curing the prism pattern, loading a base film on the prism pattern on a movable second conveyor belt; ink-jetting a liquid ultraviolet curable resin on a second surface reversing the first surface of the base film; and curing the ultraviolet curable resin using an ultraviolet lamp to form a dot pattern.

In accordance with another aspect of the present invention, provided is a backlight unit including a light guide plate and a light source, wherein the light guide plate includes: a transparent base film; a prism pattern arranged on the one surface of the base film, wherein the prism pattern is made of an ultraviolet curable resin and is provided with a first protrusion pattern by extrusion-molding; and a dot pattern arranged on the other surface of the base film, and has a total thickness of 120 to 500 μm, wherein the light source is arranged on the side of the light guide plate.

The light source may be a light emitting diode (LED) or a cold cathode fluorescent lamp (CCFL).

In accordance with another aspect of the present invention, provided is a light guide plate including: a transparent base film; a prism pattern arranged on the one surface of the base film, wherein the prism pattern is made of an ultraviolet curable resin and is including a first protrusion pattern by extrusion-molding; and a dot pattern arranged on the other surface of the base film.

The base film may be made of polyethylene terephthalate (PET).

A total thickness of the light guide plate including the base film, the prism pattern and the dot pattern is 120 to 500 μm, and the base film has a thickness of 50 to 150 μm.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, a light guide plate, a method for manufacturing the same and a backlight unit using the same according to the present invention will be described in detail with reference to the accompanying drawings.

Figure 1A:
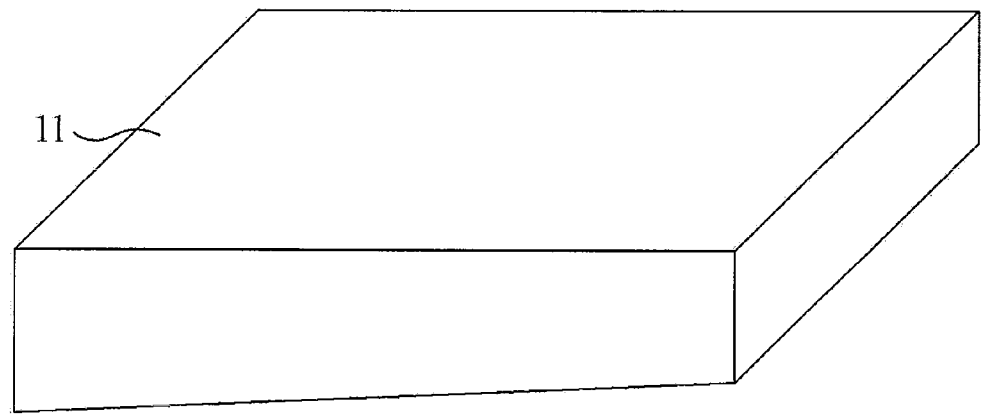
FIGS. 1A and 1B are perspective views illustrating the type of a light guide plate.
Figure 1B:
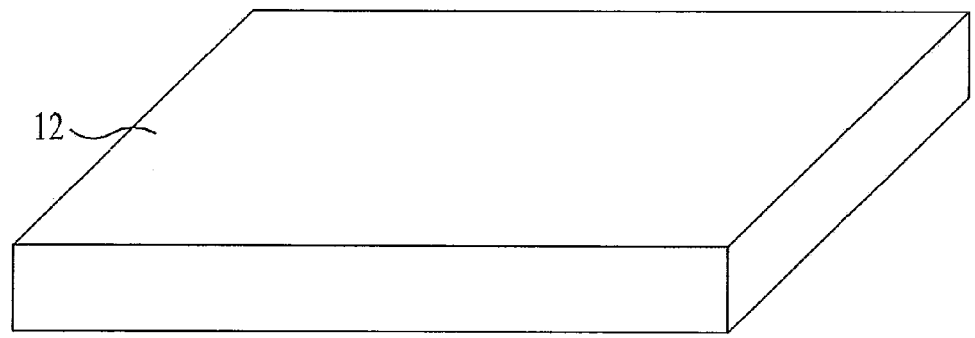
Figure 2:
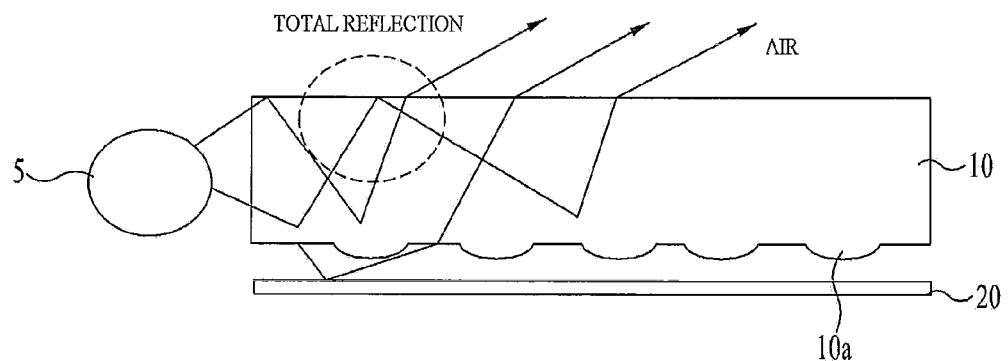
FIG. 2 is a schematic view illustrating a light-emission principle of a general light guide plate.
Figure 3:
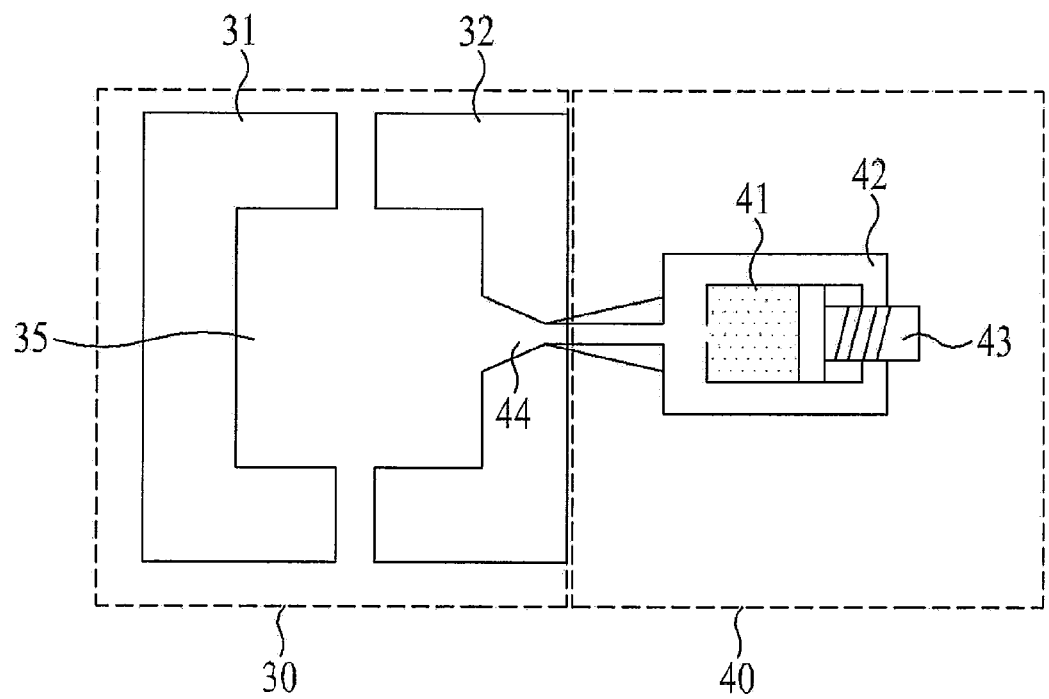
FIG. 3 is a schematic view illustrating an injection molding apparatus used for formation of a light guide plate.
Figure 4A:
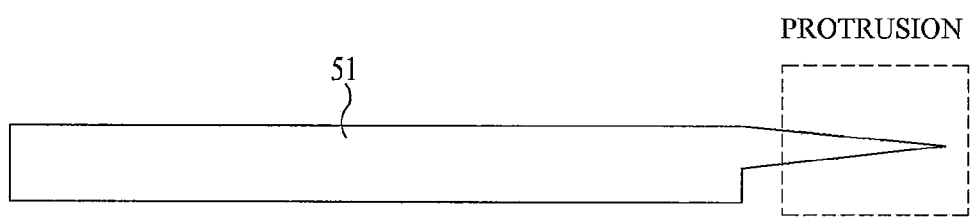
FIGS. 4A and 4B are vertical-sectional views illustrating the injection-molded light guide plate.
Figure 4B:
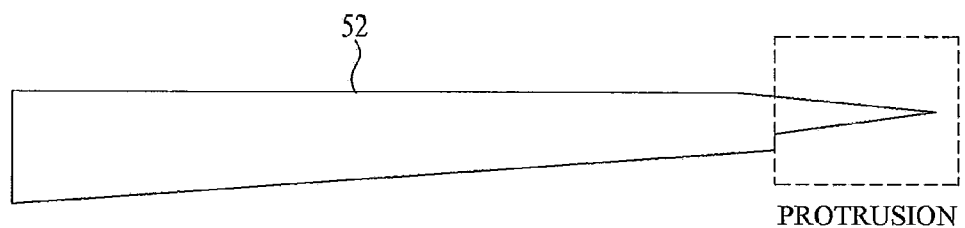
Figure 5:
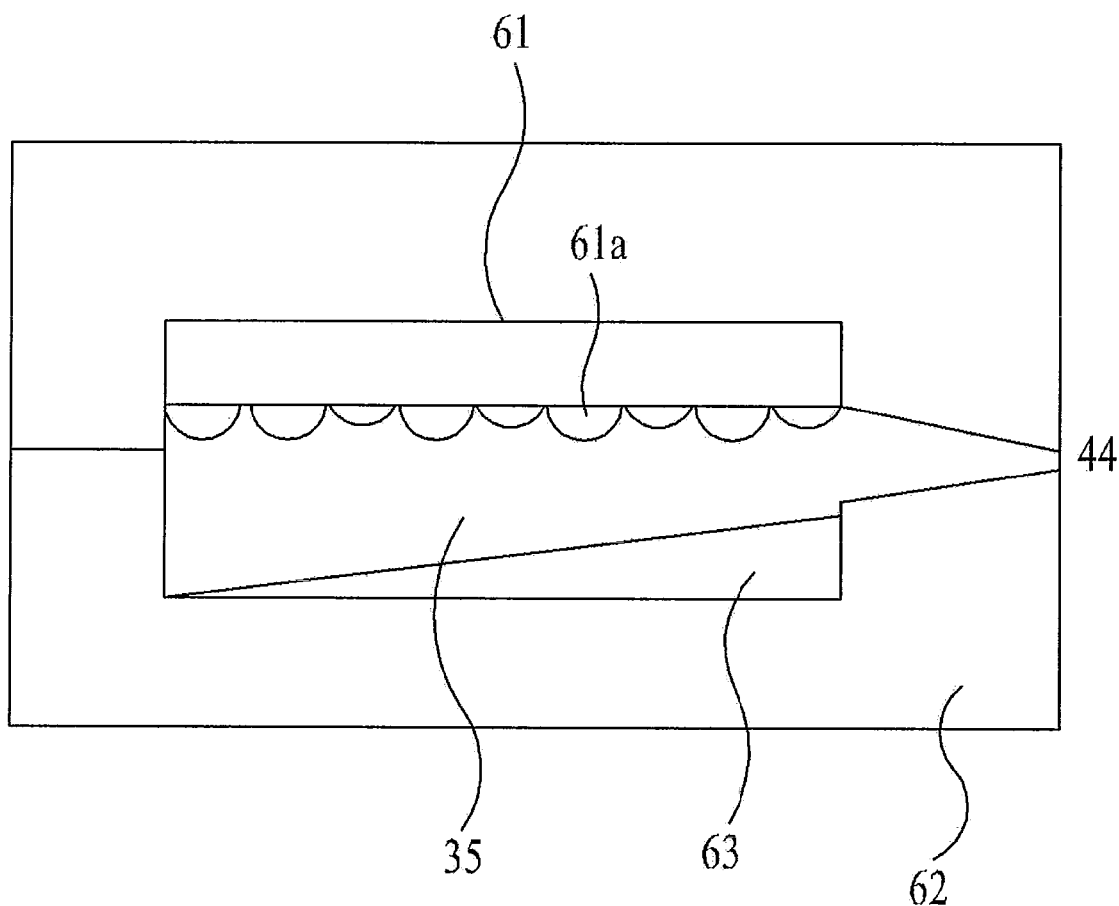
FIG. 5 is a schematic view illustrating a cavity portion comprising a mold for formation of a light guide plate used in a conventional method for forming a light guide plate.
Figure 6:
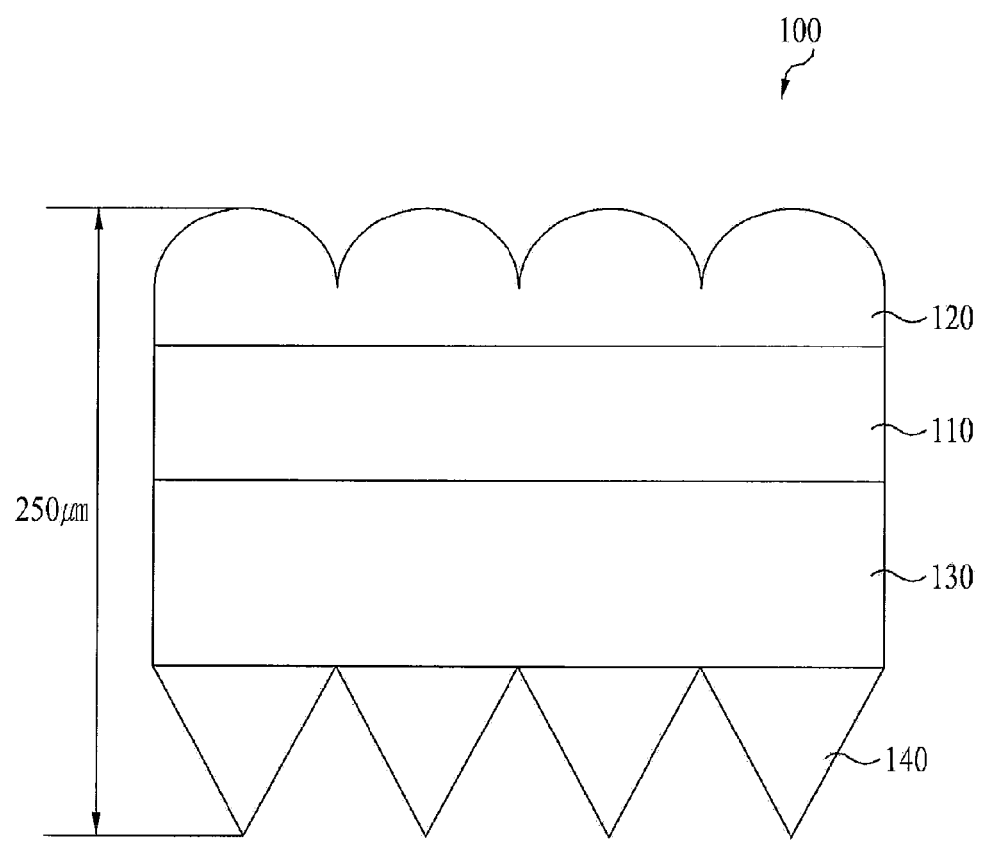
FIG. 6 is a sectional view illustrating a light guide plate according to one embodiment of the present invention.

FIG. 6 is a sectional view illustrating a light guide plate according to one embodiment of the present invention.

As shown in FIG. 6, the light guide plate 100 according to one embodiment comprises a base film 110, a dot pattern 120 arranged on the base film 110, a base layer 130 arranged under the base film 110, and a prism pattern 140 arranged on the surface of the base layer 130.

The base film 110 is made of a transparent polyethylene terephthalate (PET). The base film 110 has a thickness of 75 to 250 μm, and may have a small thickness of about 50 μm, if possible. Other materials constituting the base film 110 may include polymethyl methacrylate (PMMA) and polycarbonate (PA). The total thickness of the light guide plate 100 depends on the thickness of the base film 110 and has a thickness of 50 to 150 μm.

The total thickness of the base layer 130 and the prism pattern 140 may be greater or smaller than the thickness of the base film 110.

As illustrated above, the light guide plate 100 may have a total thickness of 250 μm, or 120 to 500 μm, and is composed of a film laminate, thus realizing slimness and softness.

The dot pattern 120, the base layer 130 and the prism pattern 140 are formed by coating a liquid material, i.e., an ultraviolet-curable resin, forming a predetermined pattern, irradiating the pattern using an ultraviolet lamp and curing the resulting pattern. The pattern formation for the dot pattern 120 and/or the prism pattern 140 may further involve a pressurizing process, allowing the pattern to be formed with a small thickness, when compared to coating.

The base layer 130 and the prism pattern 140 are integrally formed by coating an ultraviolet curable resin and treating a pattern only on the surface to form the prism pattern 140, and have the same physical properties.

The dot pattern 120 may be made of the same material as the base layer 130 and the prism pattern 140, or may be made of a different material therefrom. The dot pattern 120 uses an ultraviolet curable resin having a similar refractive index. In addition, the base film 110 made of PET, the dot pattern 120 made of an ultraviolet curable resin, the base layer 130 and the prism pattern 140 should have a refractive index higher than that of air, in order to allow light to be transferred to the upper part in accordance with the internal light transfer principle, and are thus made of a material having a refractive index of 1.35 to 1.7, preferably, a material having a refractive index of 1.5±0.1.

The prism pattern 140 may have a triangular shape, a semi-spherical shape or a triangular embossed shape. In addition, first protrusion patterns may be spaced from each other or may come in contact with each other.

For light-emission of the light guide plate 100, when a light source (not shown) is arranged on the side of the light guide plate 100, light entering from the light source to the side is not refracted but is instead totally reflected on the interface between an external air layer and the light guide plate 100, when transmitting from a high refractive index material to a low refractive index material. The prism pattern 140 serves to refract light from the surface to transfer the light to the upper part. The dot pattern 120 serves to diffuse emitted light on the rounded surface to transfer the light to the upper part. In some cases, the prism pattern 140 and the dot pattern 120 may have the same or different shape in respective regions.

Figure 7:
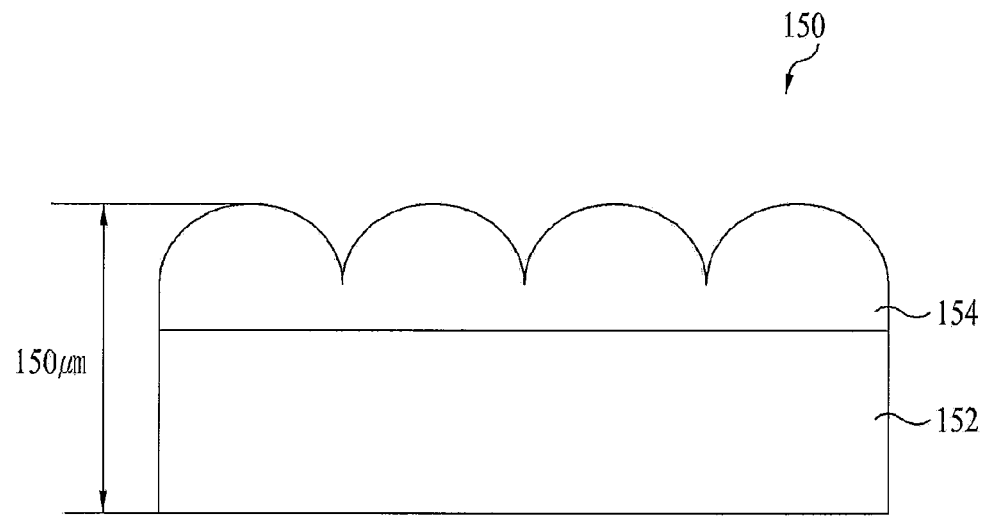
FIG. 7 is a sectional view illustrating a light guide plate according to the second embodiment of the present invention.

FIG. 7 is a sectional view illustrating a light guide plate according to the second embodiment of the present invention.

As shown in FIG. 7, the light guide plate 150 according to the second embodiment of the present invention has a structure in which a prism pattern or a dot pattern 120 is formed only on one surface of a base film 152. In this case, the bottom of the base film 152 may mirror-treated, enabling total reflection.

Hereinafter, a method for manufacturing a light guide plate will be illustrated in detail.

Figure 8A:
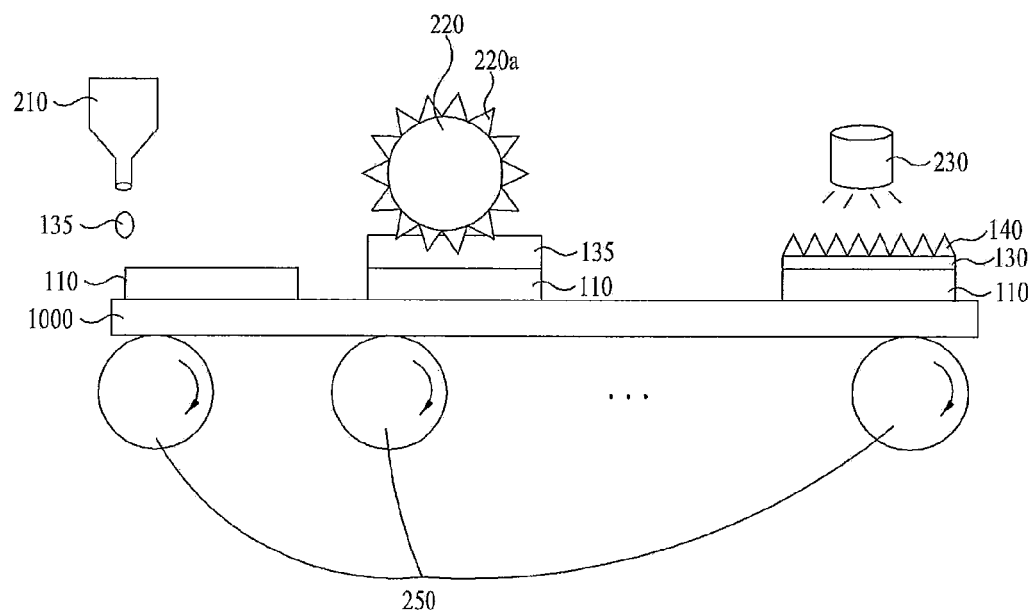
FIGS. 8A and 8B are process views illustrating a process for forming a light guide plate body and a dot pattern in the manufacture of the light guide plate.
Figure 8B:
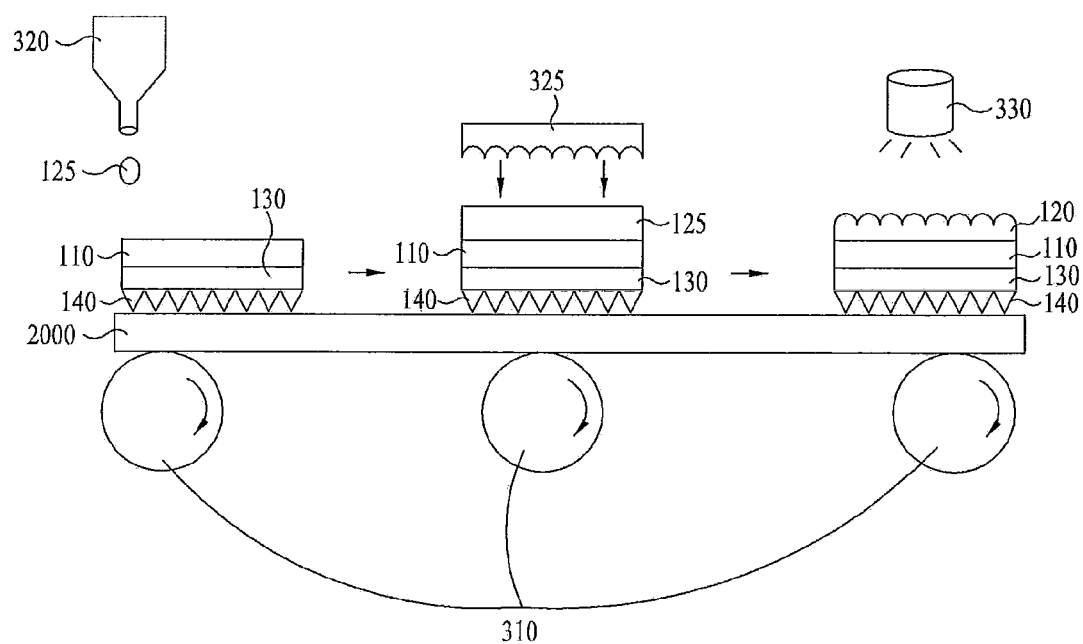
Figure 9:
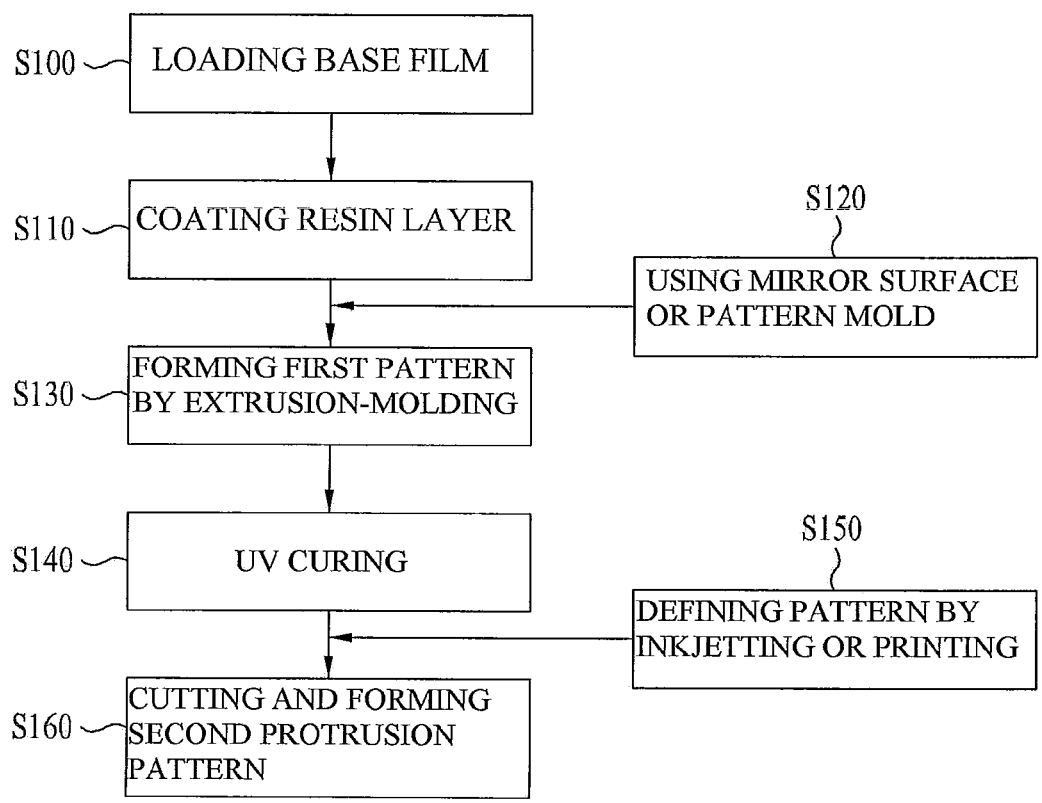
FIG. 9 is a flow chart illustrating a method for manufacturing the light guide plate.

FIGS. 8A and 8B are process views illustrating a process for forming a light guide plate body and a dot pattern in the manufacture of the light guide plate. FIG. 9 is a flow chart illustrating a method for manufacturing the light guide plate.

As shown in FIG. 8A, a first pattern forming portion is prepared, which includes a moving rail 250, a movable first conveyor belt 1000, a first nozzle 210 provided with a nozzle to spray a liquid first ultraviolet curable resin onto a sample, a roll 220 which is rotatable and provided with a prism-forming pattern 220a on the surface thereof, and a first ultraviolet irradiation lamp 230 to irradiate ultraviolet rays.

A base film 110 is loaded on the first conveyor belt 1000 of the first pattern-forming portion (S100).

Subsequently, a liquid ultraviolet curable resin 135 is coated on the first surface of the base film 110 by spraying through the first nozzle 210 (S110).

Subsequently, the roll 220 is rotated on the coated ultraviolet curable resin 135 to transcribe the pattern to the prism formation pattern 220a corresponding to the ultraviolet curable resin 135 (S130), and cured through an ultraviolet lamp to form a prism pattern 140 provided with a first protrusion pattern on the surface thereof (S140). A flat layer which remains to a predetermined thickness under the prism pattern 140 without a lower pattern is a base layer 130. The prism pattern 140 may have a triangular shape, a semi-spherical shape or a triangular embossed shape. In addition, first protrusion patterns may be spaced from each other or may come into contact with each other. In this case, the prism pattern 140 depends on the shape of the prism formation pattern 220a present on the surface of the roll 220.

Other than a particular pattern, a material for mirror-treatment may be applied to the surface of the roll 220. In this case, when the ultraviolet curable resin 135 corresponds to the roll 220, the ultraviolet curable resin 135 is mirror-treated (S120).

Meanwhile, after loading the base film 110, the coating of a liquid ultraviolet curable resin 135, and formation and curing of the prism pattern 140 are carried out by continuously moving the first conveyor belt 110 through the moving rail 250 to correspond the base film 110 to the first nozzle 210, the roll 220 and the first ultraviolet irradiation lamp 230.

As such, a laminate including the base film 110, the base layer 130 and the prism pattern 140 is referred to as a "light guide plate body".

Hereinafter, a method for forming a dot pattern will be illustrated with reference to FIG. 8B.

As shown in FIG. 8B, a second pattern forming portion is first prepared, which includes a moving rail 310, a movable second conveyor belt 1000, a second nozzle 320 provided with a nozzle to spray a liquid second ultraviolet curable resin onto a sample, and a second ultraviolet irradiation lamp 330 to irradiate ultraviolet rays.

A mold portion 325 having a reverse pattern with respect to the dot pattern to be formed between the second nozzle 320 and the second ultraviolet irradiation lamp 330 may be provided or omitted.

First, the base film 100 is loaded on the prism pattern 140 on the movable second conveyor belt 2000.

Subsequently, a liquid second ultraviolet curable resin 125 is coated through the second nozzle 320 on a second surface that reverses the first surface of the base film 110. A mold portion 325 having a reverse pattern is placed on the second ultraviolet curable resin 125 and the reverse pattern of the mold portion 325 is transcribed to the second ultraviolet curable resin 125 (S150).

Subsequently, the transcribed second ultraviolet curable resin 125 is exposed to UV radiation through the second ultraviolet lamp 330 and cured to form a dot pattern 120 (S160).

When the light guide plate comprises no mold portion 325, the second ultraviolet curable resin 125 is not coated over the entire second surface of the base film 110 through the second nozzle 320, instead ink-jetting only a pattern formation region and then curing the resin using the second ultraviolet lamp 330 to form the dot pattern 120.

Alternatively, the dot pattern 120 may be defined by printing a white paint including $SiO_2$ or $TiO_2$ from the second nozzle 320.

Both the dot pattern 120 and the prism pattern 140 may be formed or one thereof may be omitted.

Figure 10:
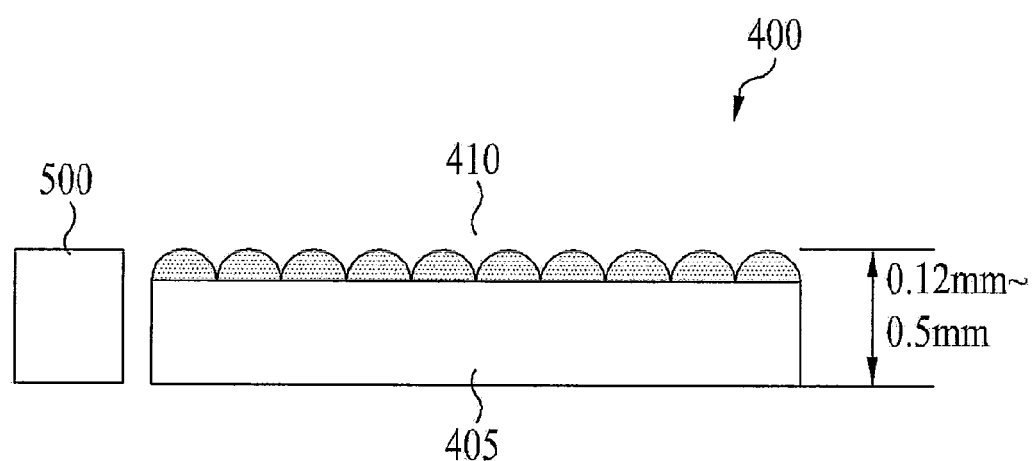
FIG. 10 is a schematic view illustrating a film-type light guide plate provided with a light source on the side thereof according to the present invention.

FIG. 10 is a schematic view illustrating a film-type light guide plate provided with a light source on the side thereof according to the present invention.

As shown in FIG. 10, the film-type light guide plate 400 according to the present invention comprises a light guide plate body 405 including a base film, and a dot pattern 410 arranged on the light guide plate body 405. The light guide plate 400 has a total thickness of about 0.12 to 0.5 mm (120 to 150 μm). The base film included in the light guide plate 400 has a thickness of 50 to 150 μm, to contribute to slimness of the light guide plate 400.

A light source 500 arranged on the side of the light guide plate 400 is a fluorescent lamp as a thin-type light emitting diode (LED). For example, the fluorescent lamp may be a cold cathode fluorescent lamp (CCFL).

Figure 11:
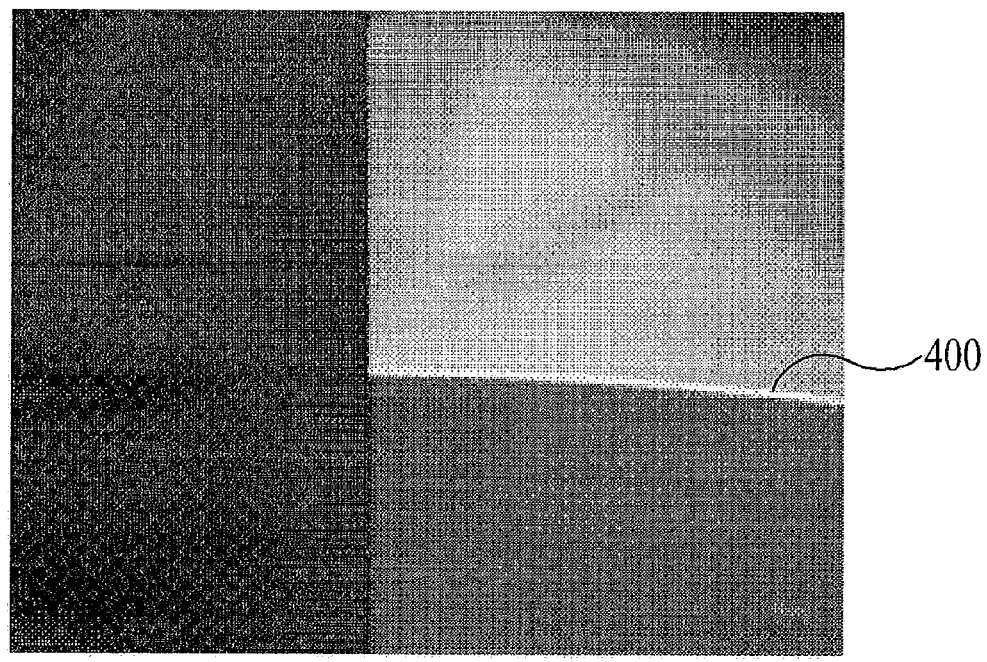
FIG. 11 is a magnified image illustrating the thickness of the light guide plate of the present invention.

FIG. 11 is a magnified image illustrating the thickness of the light guide plate of the present invention.

As shown in FIG. 11, the light guide plate 400 has a thickness of about 0.25 mm (250 μm) and the light guide plate of the present invention is a film-type, which can be made thinner by extrusion molding in the process line and is flexible.

As apparent from the fore-going, the light guide plate, a method for manufacturing the same and a backlight unit using the same of the present invention have advantages as follows:

First, in the formation of a light guide plate, a pattern is formed by loading a base film on a processing line, continuously transferring the base film, coating an ultraviolet curable resin to form a pattern, and curing the resin. Accordingly, the method of the present invention eliminates the necessity of assembly required for a conventional injection process, and enables formation of the pattern through the roll surface-treated in the shape corresponding to a protrusion pattern.

Second, a plurality of base films are continuously loaded on a processing line, some base films may be then coated and the others may be cured, thus enabling concurrent pattern formation on the plurality of base films.

Third, in the process of rotating a surface-treated roll, a predetermined pressure can be applied to a liquid ultraviolet curable resin formed on the base film, thus enabling formation of a slim and flexible thickness of light guide plate.

Fourth, the base film provided with a protrusion pattern on one surface thereof is loaded on a process line such that the rear surface of the base film is arranged thereon to form a scondary protrusion pattern. In this case, the pattern may be formed by printing, ink-jetting, or a method using a mold portion. In this case, the secondary protrusion pattern is made of an ultraviolet curable resin, thus requiring no high temperature conditions, and causing no variation in the base film or protrusion patterns formed thereon.

Fifth, in order to realize a display device that satisfies requirements of life cycle, brightness and slimness, the use of a thin light source such as light-emitting diodes (LEDs) is recently considered. Accordingly, the thickness of the light guide plate arranged on the side of LEDs should be small and flexible. The light guide plate of the present invention is a film-type which has a thickness of 0.12 to 0.5 mm, thus realizing a thin display device. In addition, the light guide plate is soft, reducing the risk of damage or breakage during the assembly process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a light guide plate, comprising:
   loading a base film on a movable first conveyor belt;
   coating a liquid ultraviolet curable resin on a first surface of the base film;
   rotating a surface-treated roll on the coated ultraviolet curable resin to form a prism pattern with a first protrusion pattern;
   curing the prism pattern using an ultraviolet lamp;
   loading the base film with the prism pattern arranged on a movable second conveyor belt, with the prism pattern of the base film to face the movable second conveyor belt, after curing the prism pattern; and forming a dot pattern on a second surface of the base film with the prism pattern, by continuously moving the base film with the prism pattern on the second conveyor belt.

2. The method according to claim 1, wherein, after loading the base film, the steps of coating the liquid ultraviolet curable resin and forming and curing the prism pattern are carried out by continuously moving the base film on the first conveyor belt.

3. The method according to claim 1, wherein the surface-treatment of the roll is carried out by applying a material for mirror-treatment to the roll or treating the roll with a prism pattern.

4. The method according to claim 1, wherein the step of forming the dot pattern comprises:

coating a liquid ultraviolet curable resin on the second surface reversing the first surface of the base film;

placing a mold portion provided with a predetermined surface pattern on the ultraviolet curable resin and then transcribing the surface pattern of the mold portion to the ultraviolet curable resin; and curing the transcribed ultraviolet curable resin using an ultraviolet lamp to form the dot pattern.

5. The method according to claim 1, the step of forming the dot pattern comprising:

ink jetting a liquid ultraviolet curable resin on the second surface reversing the first surface of the base film; and curing the ultraviolet curable resin using an ultraviolet lamp to form the dot pattern.

* * * * *